Figure 1:
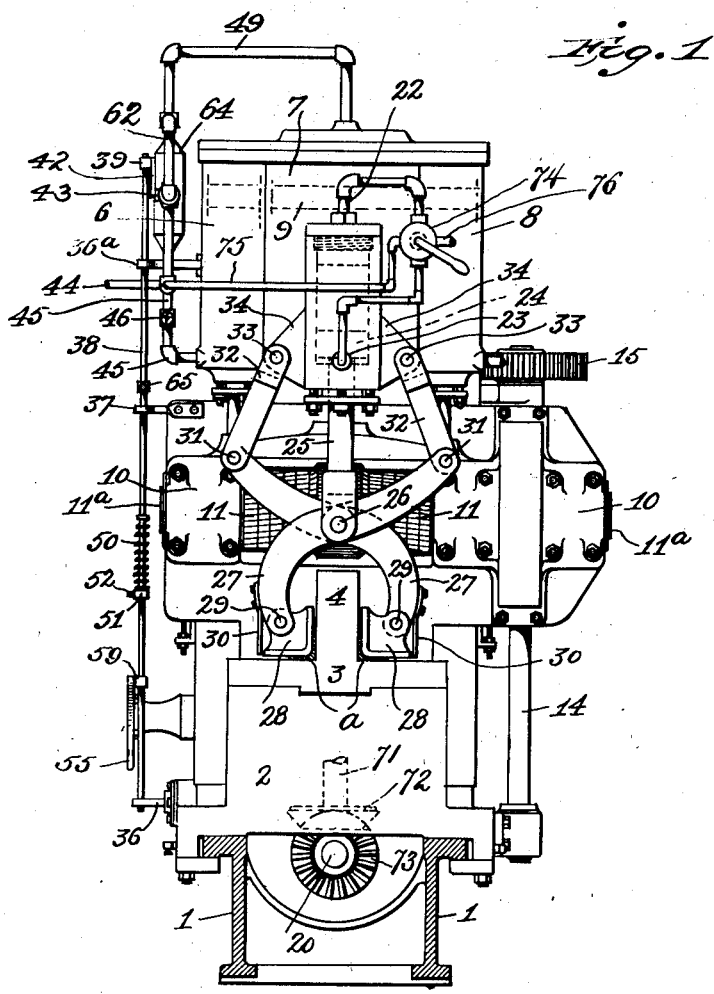

P. A. CUENOT & L. G. FISCHER.
MILLING MACHINE.
APPLICATION FILED JAN. 15, 1910.

1,047,177.

Patented Dec. 17, 1912.
2 SHEETS—SHEET 1.

Witnesses
May Ellis
R. Sommers

Inventors
Paul A. Cuenot and
Lewis G. Fischer
By Henry Orth Jr.
Attorney

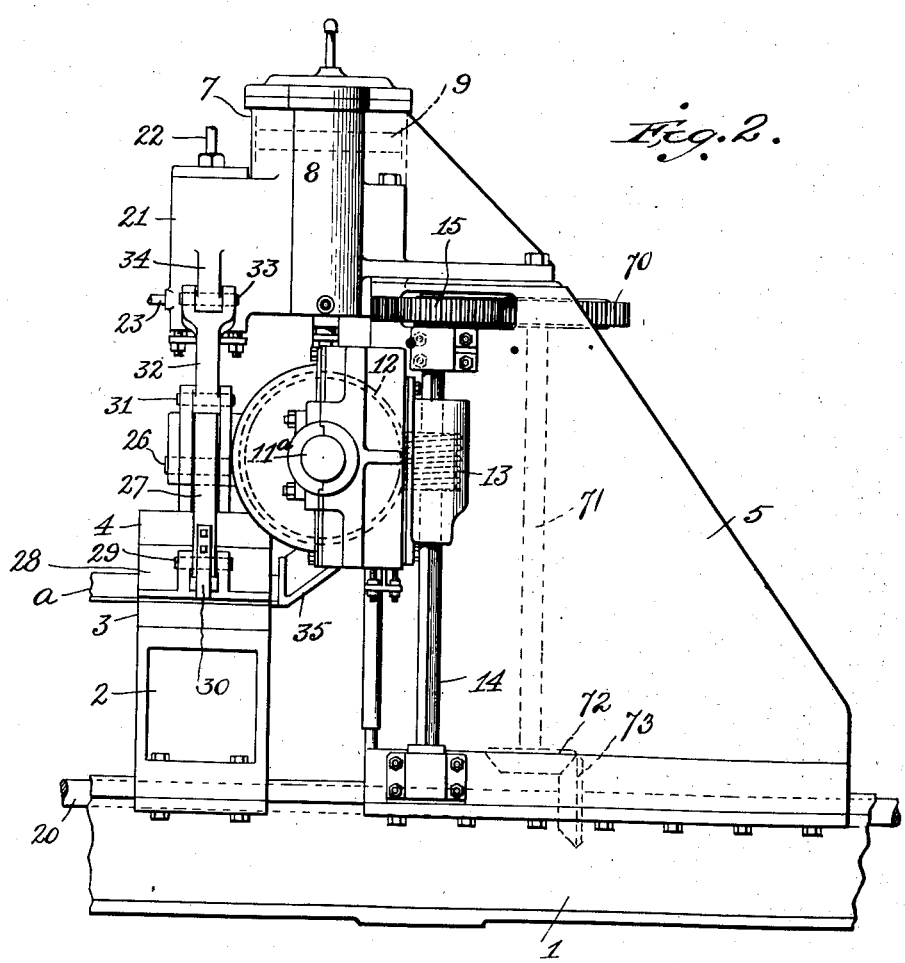

UNITED STATES PATENT OFFICE.

PAUL A. CUENOT, OF STEELTON, AND LEWIS G. FISCHER, OF HARRISBURG, PENNSYLVANIA.

MILLING-MACHINE.

1,047,177. Specification of Letters Patent. Patented Dec. 17, 1912.

Application filed January 15, 1910. Serial No. 538,304.

*To all whom it may concern:*

Be it known that we, PAUL A. CUENOT and LEWIS G. FISCHER, citizens of the United States, and residents, respectively, of Steelton and Harrisburg, both in the county of Dauphin and State of Pennsylvania, have invented certain new and useful Improvements in Milling-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to milling machines, and has for its object to provide an efficient and readily operated machine for milling or chamfering the ends of plates, angles, beams, and other structural iron and steel shapes.

The machine is provided with a sliding head carrying one, or a group of milling cutters fed across the face of the work by fluid actuated mechanism, with fluid actuated means to effectually clamp the work under uniformly distributed pressure while being milled, and with details of construction hereinafter more fully described, and particularly pointed out in the claims.

Referring to the drawings, in which like parts are similarly designated—Figure 1 is a front elevation of a milling machine embodying our invention; Fig. 2 is a side view thereof.

On a suitable base 1 is secured a work-supporting table 2 having a removable top 3. This top as shown is constructed to receive and sustain a particular shape, to wit, angles, and to this end is provided with a vertical rib 4. Other shaped tops are intended to replace this particular shaped top when necessary, to properly support other shapes of structural iron or steel not adapted for support on this particular table top. On the base 1 is also mounted a frame 5, having three cylinders, 6, 7 and 8, of which the middle one 7 is the largest and contains a piston 9 that is connected to the vertically movable milling tool head 10 and operates to move this head, with the tool 11 therein, downward. The other, smaller, cylinders, 6 and 8, contain pistons also suitably connected to the head 10 near its sides, and operate to raise the head 10 when the pressure on the large piston 9, is removed.

The milling tool or tools 11 are mounted on arbor 11ª which carries a worm wheel 12, said worm wheel being driven by a worm 13 mounted in the head 10, both fully inclosed thereby, and the worm being splined to a vertical shaft 14 mounted in the frame 5. This shaft 14 has at its upper end a gear wheel 15, which is driven by a gear wheel 70, on a shaft 71, inside of the frame 5, receiving motion by a pair of miter gears 72, 73, from a main driving shaft 20.

The afore-mentioned mechanism for rotating the milling tool or tools 11, forms no part of the present invention.

21 is a cylinder having an air inlet pipe 22, and an air outlet pipe 23 and contains a piston 24 whose piston rod 25 is connected by pin 26, to floating levers 27, there being two such floating levers pivoted together intermediate their ends by pin 26. The lower ends of these levers carry shoes 28 conforming to or fitting the particular structural shape to be treated in the machine. These shoes are preferably, but not necessarily, pivoted at 29 to the ends of the levers 27, and are limited in their outward swing on their pivots 29 by spring or other stops 30 secured to the levers 27 and against which said shoes may rest. The upper ends of said levers 27 are pivotally connected at 31 to links 32 whose upper ends are pivoted at 33 to ears 34 formed on the sides of the cylinder 21.

35 is a stop mounted on the vertically movable head 10 against which the angles *a* or other shapes are placed, in order to properly position their ends in the path of the milling tool.

Air or other pressure fluid is admitted through pipe 22, from the hand-controlled three-way valve 74 supplied with pressure air from pipe 75, on top of piston 24 and moves the same downward, pipe 23 being vented to the atmosphere through the three-way valve 74 and vent 76.

As the piston moves downward rod 25 moves downward, causing levers 27 to swing about their pivot 26 in the end of this rod, thereby causing the shoes 28 to move both downward and inward until they engage and hold the structural shape *a* in position on the table top 3.

36 and 36ª are guides fixed on a portion of the frame 5.

37 is a tappet secured to and movable with the head 10, also serving to guide a vertically movable actuating rod 38. The rod 38 is provided with a head 39, which is connected to a lever 42 that operates a three-way valve 43. This valve is directly connected with the pressure line pipe 44 which has a branch 45, controlled by a regulating valve 46, leading to the under side of the smaller pull-back pistons in cylinders 6 and 8. Line pressure is always maintained beneath the pistons in the smaller cylinders.

When the valve 43 is in position to admit pressure air, said air passes through pipe 44 and pipe 49 into the top of the main cylinder 7. Pressure on top of piston 9 causes the cutter head 10 to descend and feed across the face of the work, and when the head is near the lower end of its position the tappet 37 strikes the top of a coil spring 50 on rod 38, said spring being adjustably held in position by a collar 51 and a set screw 52. The spring is then compressed until the pressure is sufficient to cause the downward movement of the rod 38 and the lever 42 is immediately brought to its lowest position. The pressure medium on top of piston 9 then passes through pipe 49, by-pass 62, valve 43, to the exhaust head 64, the pressure being relieved on the upper side of piston 9 allows the pull-back pistons to move upward by reason of the continuous line pressure being continually active on the under sides of these pistons. When the head 10 is moving to its upper position tappet 37 strikes an adjustable stop 65 on rod 38, thus moving this rod upward, so that the three-way valve lever 42 will be moved to its central position, thus holding the pressure head 10 stationary by cutting off the exhaust from cylinder 7.

When new work is clamped on the table top 3, lever 55 is depressed by hand, and the operation is repeated.

We claim—

1. In a milling machine, the combination with a work sustaining table, of a vertically reciprocating member mounted centrally above the latter, crossed levers pivotally connected with said member intermediate their ends and bodily movable thereby, links pivotally connected to the power ends of said levers, and stationary abutments to which the links are pivotally connected whereby the movement of said reciprocating member toward and from the table will cause operative ends of said levers to simultaneously move toward one another and toward the table and vice versa.

2. In a milling machine, the combination, with a work sustaining table, of a stationary cylinder mounted centrally above the latter, a vertically movable piston in the cylinder, crossed levers pivoted on the piston rod intermediate their ends, and links pivotally connected to the cylinder and to the power ends of the levers whereby the movement of the piston toward and from the table will cause the operative ends of said levers to simultaneously move toward each other and toward the table and vice versa.

3. In a milling machine, the combination with a work sustaining table, of a pair of floating crossed levers suspended above the table, a pivot connecting the levers together at their crossing point and about which both of said levers swing, means to move said pivot and simultaneously bodily move the levers to and from the table, and means to cause the levers to swing on said pivot during their bodily movement.

4. In a milling machine, the combination with a work sustaining table; of a pair of floating levers pivotally connected together after the manner of a pair of tongs, pivoted suspending links for the ends of said levers, shoes pivotally connected to the operative ends of said levers, limiting means secured to the levers and against which the shoes are adapted to swing when in inoperative position, a pressure fluid operated piston and cylinder and a piston rod between the piston and pivotal connection for the levers.

In testimony that we claim the foregoing as our invention, we have signed our names in presence of two subscribing witnesses.

PAUL A. CUENOT.
LEWIS G. FISCHER.

Witnesses:
GEO. W. PARSONS,
FRANK A. ROBBINS, Jr.